(12) United States Patent
Ishida et al.

(10) Patent No.: US 10,033,899 B2
(45) Date of Patent: Jul. 24, 2018

(54) LIGHTING DEVICE INCLUDING A BOARD TO MOUNT THE LIGHT SOURCE ON A MOUNT SURFACE OPPOSITE A COVER, IMAGE READING DEVICE, AND IMAGE FORMING APPARATUS

(71) Applicants: Masatoshi Ishida, Kanagawa (JP); Yoshiaki Nagao, Kanagawa (JP); Satoshi Narai, Kanagawa (JP); Atsushi Sugai, Kanagawa (JP); Masafumi Kishi, Kanagawa (JP); Makoto Noda, Tokyo (JP)

(72) Inventors: Masatoshi Ishida, Kanagawa (JP); Yoshiaki Nagao, Kanagawa (JP); Satoshi Narai, Kanagawa (JP); Atsushi Sugai, Kanagawa (JP); Masafumi Kishi, Kanagawa (JP); Makoto Noda, Tokyo (JP)

(73) Assignee: Ricoh Company LTD., Tokyo (JP)

( * ) Notice: Subject to any disclaimer, the term of this patent is extended or adjusted under 35 U.S.C. 154(b) by 0 days.

(21) Appl. No.: 15/164,917

(22) Filed: May 26, 2016

(65) Prior Publication Data

US 2016/0352955 A1    Dec. 1, 2016

(30) Foreign Application Priority Data

Jun. 1, 2015   (JP) ................................. 2015-111774

(51) Int. Cl.
*G03G 15/04*    (2006.01)
*H04N 1/028*    (2006.01)
(Continued)

(52) U.S. Cl.
CPC ......... *H04N 1/02895* (2013.01); *G03G 15/50* (2013.01); *H04N 1/02815* (2013.01); *H04N 1/02835* (2013.01); *H04N 1/193* (2013.01)

(58) Field of Classification Search
CPC ................................. B41J 2/385; G03G 15/50
(Continued)

(56) References Cited

U.S. PATENT DOCUMENTS 8,804,088 B2 *   8/2014   Lee ...................... G02B 6/0083
                                                   349/150
2009/0244654 A1   10/2009   Tagawa et al.
(Continued)

FOREIGN PATENT DOCUMENTS

JP    2010-130056    6/2010
JP    2010-217418    9/2010
(Continued)

OTHER PUBLICATIONS

Extended European Search Report dated Sep. 28, 2016.

*Primary Examiner* — Quana M Grainger
(74) *Attorney, Agent, or Firm* — Harness, Dickey & Pierce, P.L.C.

(57) ABSTRACT

A lighting device includes a light source, a board, and a light guide. The light source emits light. The board mounts the light source on a mount surface perpendicular to a light emission surface of the light source. The light guide has an incident surface which the light emitted from the light source enters. The incident surface is opposed to the light emission surface. The light guide extends from the incident surface in a direction of the emitted light and is bent toward an irradiated surface of an irradiation target on a way of the light guide. The board is disposed such that an opposite surface of the board opposite the mount surface is opposed to the irradiated surface of the irradiation target.

19 Claims, 14 Drawing Sheets

(51) Int. Cl.
*G03G 15/00* (2006.01)
*H04N 1/193* (2006.01)

(58) Field of Classification Search
USPC .............................................. 399/4
See application file for complete search history.

(56) References Cited

U.S. PATENT DOCUMENTS

| | | |
|---|---|---|
| 2010/0129116 A1* | 5/2010 | Shinkawa ........ G03G 15/04036 399/200 |
| 2010/0232834 A1 | 9/2010 | Ishida |
| 2011/0013213 A1 | 1/2011 | Takahashi et al. |
| 2011/0096374 A1* | 4/2011 | Takahashi .......... H04N 1/00986 358/475 |
| 2012/0133994 A1 | 5/2012 | Yamasaki et al. |
| 2013/0265619 A1 | 10/2013 | Kobayashi |
| 2013/0293932 A1 | 11/2013 | Sugai et al. |
| 2014/0078560 A1 | 3/2014 | Nagao et al. |
| 2014/0192386 A1 | 7/2014 | Ishida |
| 2015/0249762 A1 | 9/2015 | Ishida et al. |

FOREIGN PATENT DOCUMENTS

| | | |
|---|---|---|
| JP | 2013-118523 | 6/2013 |
| JP | 2015-133724 | 7/2015 |
| KR | 20110006582 A | 1/2011 |

* cited by examiner

US 10,033,899 B2

LIGHTING DEVICE INCLUDING A BOARD TO MOUNT THE LIGHT SOURCE ON A MOUNT SURFACE OPPOSITE A COVER, IMAGE READING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2015-111774, filed on Jun. 1, 2015, in the Japan Patent Office, the entire disclosure of which is hereby incorporated by reference herein.

BACKGROUND

Technical Field

Embodiments of this disclosure relate to a lighting device, an image reading device, and an image forming apparatus.

Related Art An image forming apparatus including an image reading device is known. For example, such an image reading device reads an image by moving a travelling member along a document surface in a sub-scanning direction and guiding light reflected by the document surface to an imaging device. The travelling member holds a lighting device to irradiate with light the document surface with light. The document surface is an irradiated surface of a document as an irradiation target placed on an exposure glass.

SUMMARY

In an aspect of this disclosure, there is provided a lighting device that includes a light source, a board, and a light guide. The light source emits light. The board mounts the light source on a mount surface perpendicular to a light emission surface of the light source. The light guide has an incident surface which the light emitted from the light source enters. The incident surface is opposed to the light emission surface. The light guide extends from the incident surface in a direction of the emitted light and is bent toward an irradiated surface of an irradiation target on a way of the light guide. The board is disposed such that an opposite surface of the board opposite the mount surface is opposed to the irradiated surface of the irradiation target.

In another aspect of this disclosure, there is provided an image reading device that includes the lighting device to illuminate a document surface with light and an imaging device to receive reflected light from the document surface and pick up an image of the document surface.

In still another aspect of this disclosure, there is provided an image forming apparatus that includes the image reading device to read the image of the document surface and an image forming device to form an image on a recording medium, based on information of the image read by the image reading device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
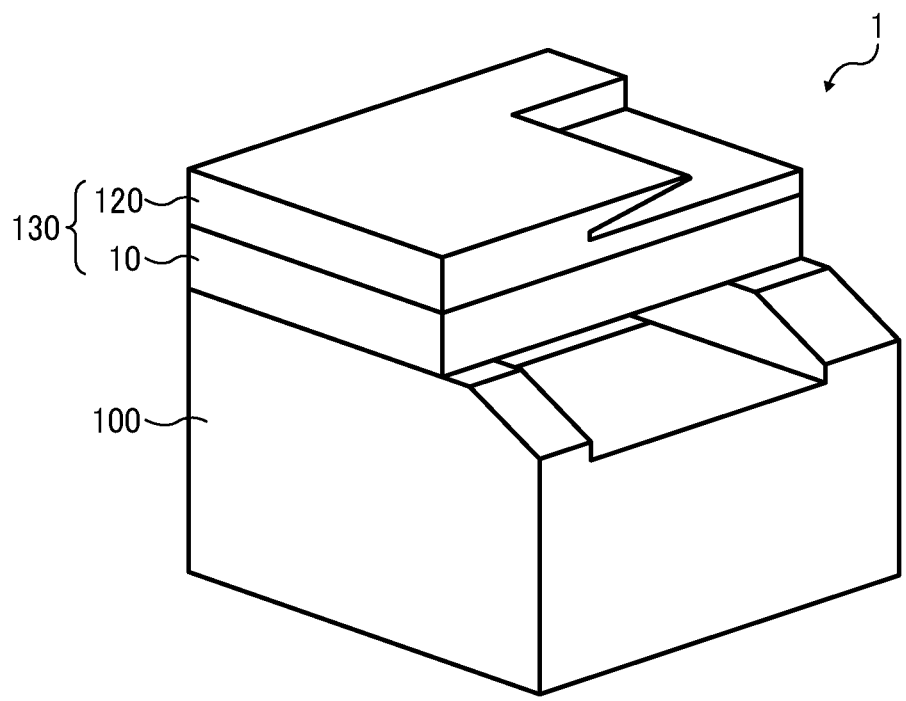
FIG. 1 is a general outer perspective view of a copier.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

In the following, an electrophotographic copier hereinafter, simply referred to as a "copier 1") will be described as an example of an embodiment of an image forming apparatus (hereinafter, the present embodiment is referred to as a "first embodiment") to which the present disclosure is applied. FIG. 1 is a general outer perspective view of the copier 1 as an image forming apparatus according to the embodiment. Approximately on the central part of a body of the copier 1, there is disposed a printer section 100 as an image forming device, and on the printer section 100 is disposed an image reading unit 130. On the image reading unit 130, there are provided a scanner section 10 and an automatic document feeder (ADF) 120 as a document feeder.

Figure 2:
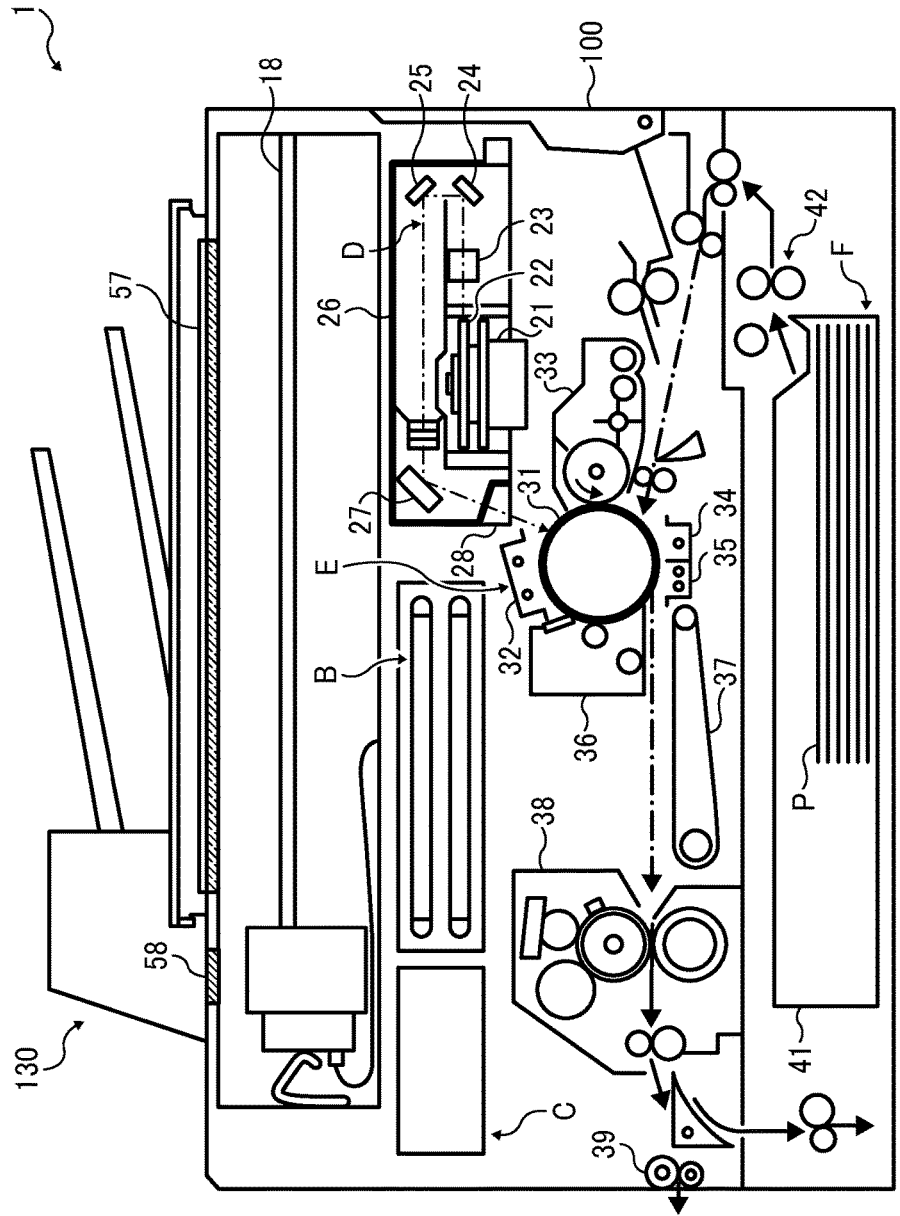
FIG. 2 is a schematic view of a configuration of the copier.

FIG. 2 is a schematic view of a configuration of the copier 1. The printer section 100 is equipped with an image processor B, an image storage C, an image writer an image recording section E, a sheet feeder F, and the like.

The image recording section E includes a photoconductor drum 31, which is a latent image bearer, and the image recording section E includes a charging device 32, a developing device 33, a transfer device 34, a separation device 35, a cleaning device 36, and the like that are disposed in the periphery of the photoconductor drum 31. Further, on the downstream side of the separation device 35, there are also disposed a conveyance device 37, a fixing device 38, and a sheet ejection device 39, which also constitute the image recording section E. The sheet feeder F includes a sheet feed tray 41 that stores transfer sheets of paper P as a recording medium, a sheet feed assembly 42 that separates and feeds a transfer sheet of paper P in the sheet feed tray 41, and other components.

The surface of the photoconductor drum 31 is uniformly charged by the charging device 32 while being rotate. The surface of the photoconductor drum 31 having been charged is irradiated with a laser light ray 3 from the image writer D while the laser light ray 3 is being scanned in the axial direction of the photoconductor drum, where the laser light ray 3 is modulated based on the information obtained by an image processing performed, by the image processor B, on image information read by the image reading unit 130. By this operation, an electrostatic latent image is formed on the photoconductor drum 31. The electrostatic latent image formed on the photoconductor drum 31 is developed to be a toner image when charged toner adheres to the latent image at a developing area at which the photoconductor drum 31 faces the developing device 33. In the meantime, the transfer sheet of paper P is fed and conveyed by the sheet feeder F and is sent out and conveyed, at a predetermined timing, to the transfer area, at which the photoconductor drum 31 faces the transfer device 34. Then, the transfer device 34 gives the transfer sheet of paper P electric charge having the polarity opposite to the charge of the toner image on the photoconductor drum 31, so that the toner image formed on the photoconductor drum 31 is transferred to the transfer sheet of paper P. Next, the transfer sheet of paper P is separated from the photoconductor drum 31 and is conveyed by the conveyance device 37 to the fixing device 38, and the toner image is fixed by the fixing device 38. After that, the transfer sheet of paper P is ejected outside the copier by the sheet ejection device 39. The surface of the photoconductor drum 31, from which the toner image has been transferred by the transfer device 34, is cleaned by the cleaning device 36 to remove the toner remaining on the photoconductor drum 31.

The image processor B performs a predetermined image processing on an image signal transmitted from the image reading unit 130. Examples of the image processing performed on the image processor B include shading correction, brightness/density conversion, edge emphasis (EE) processing, character/dot discrimination, filter/zoom processing, copy γ correction, writing density correction, two beam control, error diffusion processing, data compression processing, and the like. Then, the image data processed on the image processor B is temporarily stored in the image storage C. The image data a temporarily stored in the image storage C is output to the image writer D. On the image writer, D, writing light is output from a semiconductor laser, based on the image data. The writing light from the semiconductor laser is rotationally scanned by a rotary polygon mirror (polygon mirror) 22 rotated by a drive motor 21. The rotationally scanned writing light goes through an fθ lens 23 and passes through a first mirror 24, a second mirror 25, a cylindrical lens 26, and a third mirror 27. Then, the writing light is emitted from a cover glass 28 and is applied to the photoconductor drum 31 provided on the image recording section E.

Figure 3:
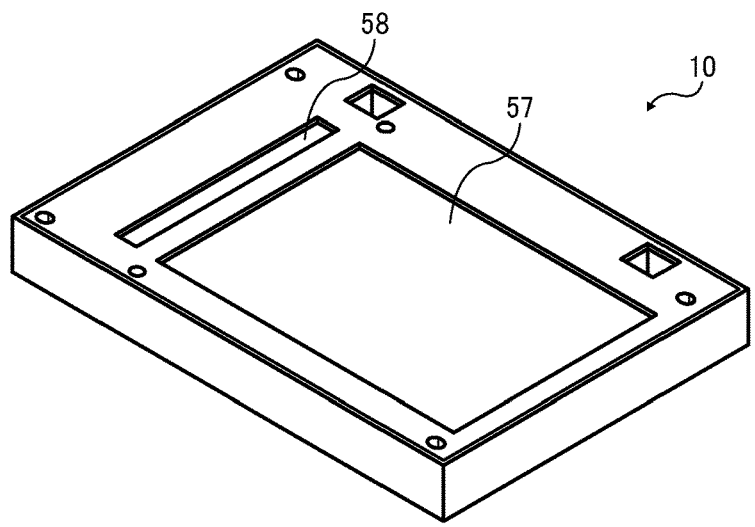
FIG. 3 is a perspective view illustrating a scanner section.

FIG. 3 is a perspective view illustrating the scanner section 10. On the scanner section 10, an automatic document feeder 120 is mounted and is swingably held by hinges, so that the upper surface of the scanner section 10 can be opened. The upper surface of the scanner section 10 is equipped with an exposure glass 57 and a slit glass 58 as transparent members.

Figure 4:
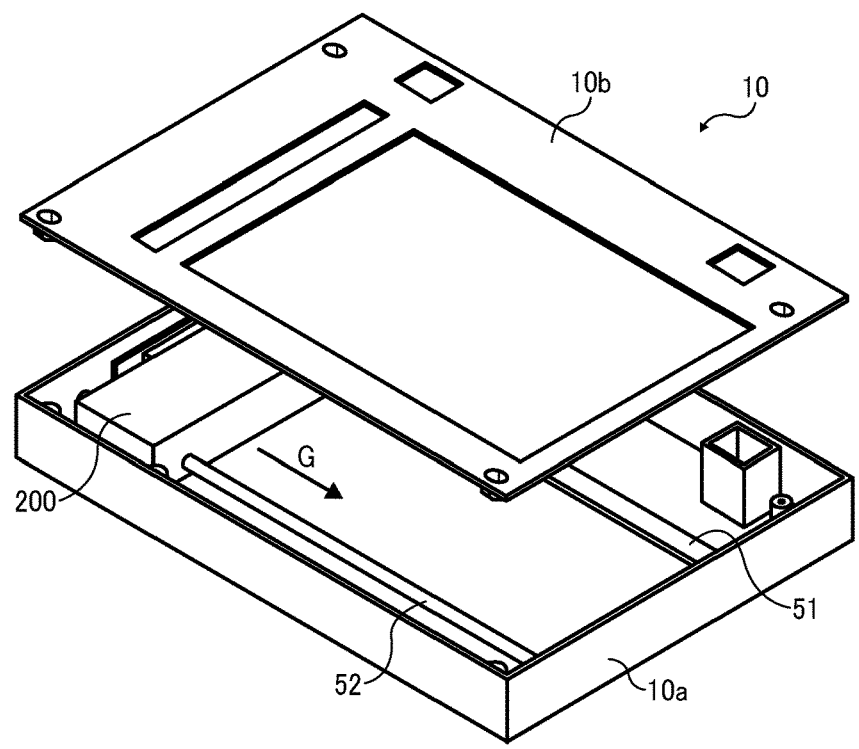
FIG. 4 is a perspective view illustrating an inside of the scanner section.

FIG. 4 is a perspective view illustrating the inside of the scanner section 10. As illustrated in FIG. 4, the scanner section 10 has an approximately cuboid box-shaped housing 10a containing an integrated scanning unit 200 and the like, and has an scanner cover 10b fixed to the housing 10a such that the scanner cover 10b closes the upper surface of the housing 10a. The integrated scanning unit 200 is movably held by a guide rod 52 and a guide rail 51, which are mounted on the housing 10a in the left-right direction in FIG. 4, so that the integrated scanning unit 200 can move in the direction indicated by arrow G in FIG. 4

Figure 5:
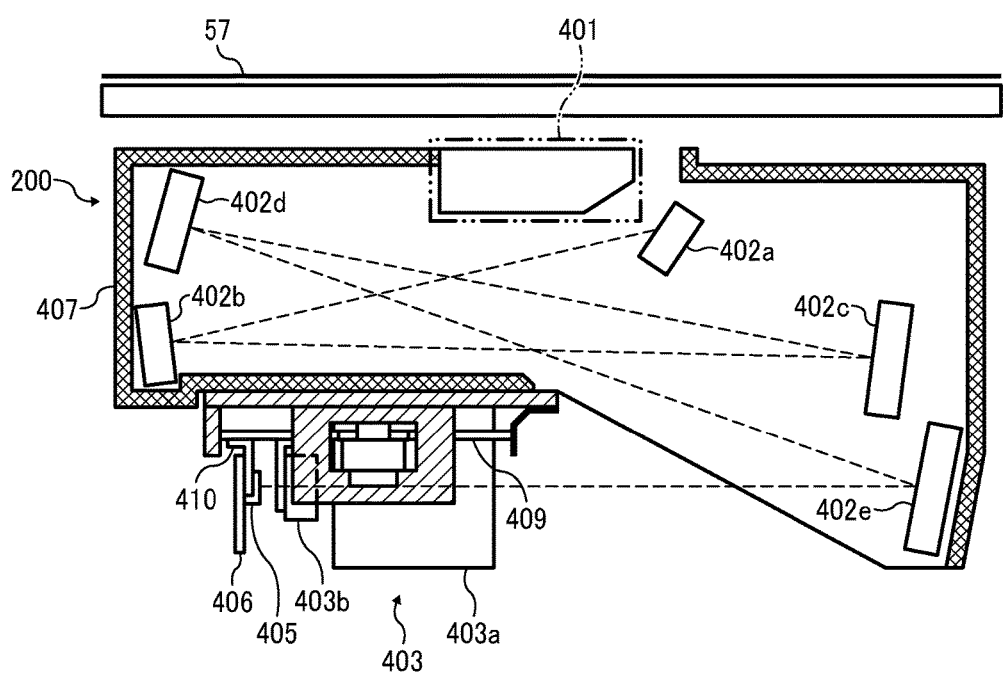
FIG. 5 is a schematic view of a configuration illustrating an integrated scanning unit.

FIG. 5 is a schematic view of a configuration of the integrated scanning unit 200. As illustrated in FIG. 5, in a frame 407 of the integrated scanning unit 200, there is housed a lighting unit 401 as a lighting device. Further, the frame 407 houses five reflection mirrors 402a, 402b, 402c, 402d, and 402e that reflect light reflected from the document as an imaging target, and also houses an imaging lens unit 403 that converges the light reflected by the reflection mirrors. Further, the frame 407 houses an image sensor 405 that serves as an imaging device and converts the light converged by the imaging lens unit 403, and also houses a drive circuit board 406 that outputs an image signal, based on the electric signal having been output from the image sensor 405 driven by the image sensor 405.

The imaging lens unit 403 has a first lens group 403a disposed on the reflection mirror 402e side and a second lens group 403b disposed on the image sensor 405 side. The first lens group 403a has a positive power, and the second lens group 403b has a negative power. In the present embodiment, the first lens group 403a is made up of one lens; however, the first lens group 403a may be made up of a plurality of lenses (for example, two to four lenses) that contain at least one positive lens. Since the imaging lens unit 403 is made up of the first lens group 403a having a positive power and the second lens group 403b having a negative power, chromatic aberration is corrected, whereby a high resolution image can be formed on the image sensor 405. Further, the focal length can be made short, and the integrated scanning unit 200 can thus be made compact. Further, the distance, which is a so-called back focus, from the second lens group 403b to the image sensor 405 can be short, whereby the integrated scanning unit 200 can be compact.

The first lens group 403a and the second lens group 403b are held on a lens mount 409. The drive circuit board 406, on which the image sensor 405 is mounted, is fixed on the lens mount 409 via a fixing bracket 410. As the image sensor 405, there can be used a charge-coupled device (CCD), a Complementary Metal Oxide Semiconductor (CMOS), or the like.

Figure 6:
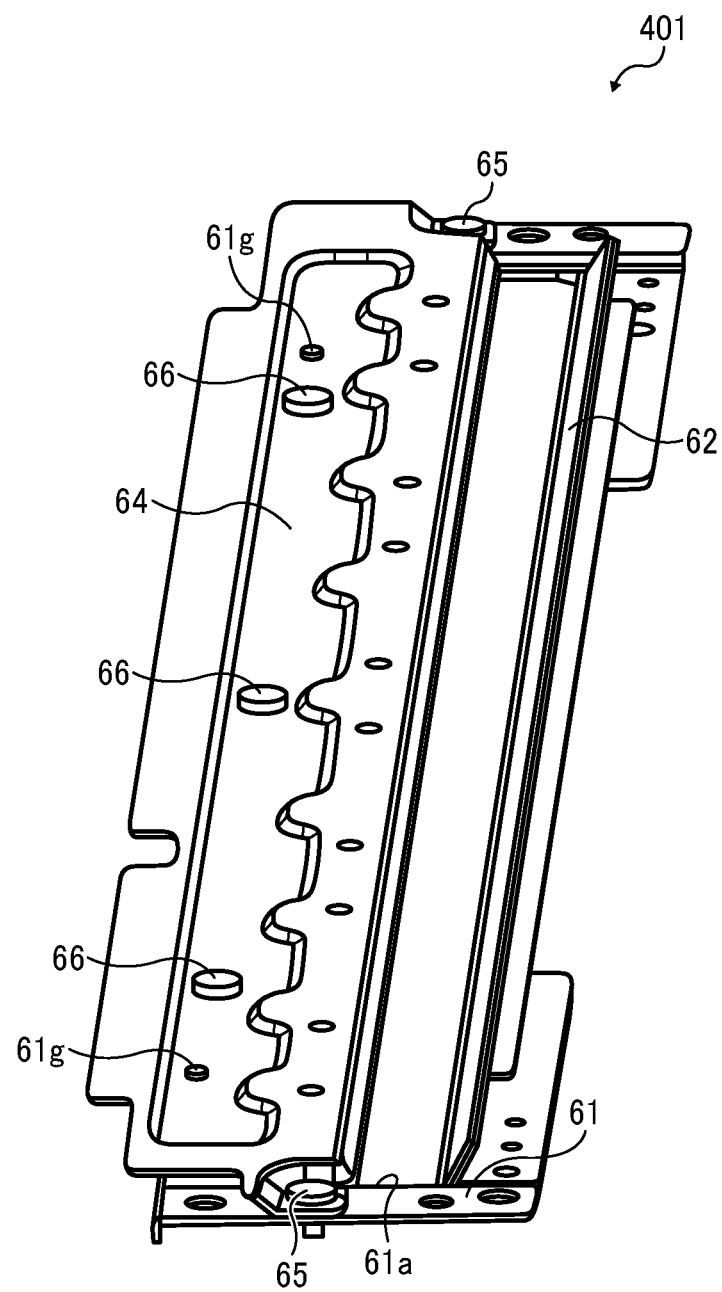
FIG. 6 is a perspective view of a lighting unit.
Figure 7:
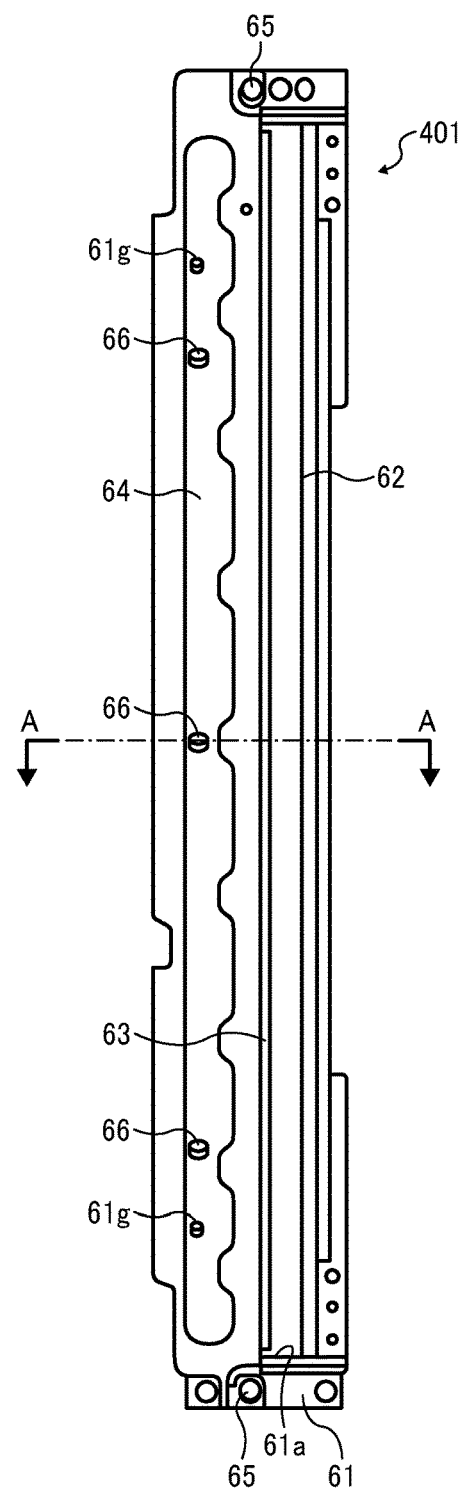
FIG. 7 is a plan view of the lighting unit.
Figure 8:
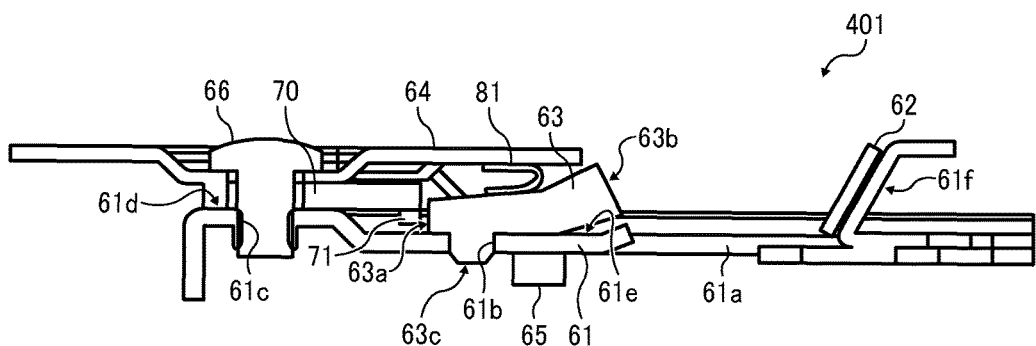
FIG. 8 is a cross-sectional view along line A-A in FIG. 7.

Next, a description will be given to the lighting unit 401, which is a feature of the present embodiment. FIG. 6 is a perspective view of the lighting unit 401, and FIG. 7 is a plan view of the lighting unit 401. Further, FIG. 8 is a cross-sectional view along line A-A in FIG. 7. The lighting unit 401, which is the lighting device, is equipped with a board 70 on which LEDs 71 are mounted as a light source; and a light guide 63 to guide the light emitted from the LEDs 71 to an illumination area of the document. The above board 70 and light guide 63 are held on a light guide holder 61e of a base sheet metal 61, which is an optical guide holder. Further, in the base sheet metal 61, there is formed an opening 61a, through which the light reflected from the document passes. On the side, beyond the opening 61a, opposite to the side on which the light guide 63 and the board 70 are held, a reflector 62 is fixed to a reflector fixing part 61f of the base sheet metal 61. Further, a cover 64, which is a pressing member, is fixed to the base sheet metal 61 with a plurality of screws 65 and 66.

Further, a board holder 61d to hold the board 70 is provided on the base sheet metal 61; a step is formed between the board holder 61d and the light guide holder 61e; and the board holder 61d is located on the upper side (the exposure glass side) of the light guide holder 61e.

The positioning projections 63c provided on the light guide 63 are fit in positioning holes 61b formed in the light guide holder 61e of the base sheet metal 61, so that the light guide 63 is positioned with respect to the base sheet metal 61. Further, plate springs 81 as biasing members provided on the cover 64 biase the light guide 63 toward the light guide holder 61e of the base sheet metal 61, so that the light guide 63 is held on the base sheet metal 61.

Figure 9:
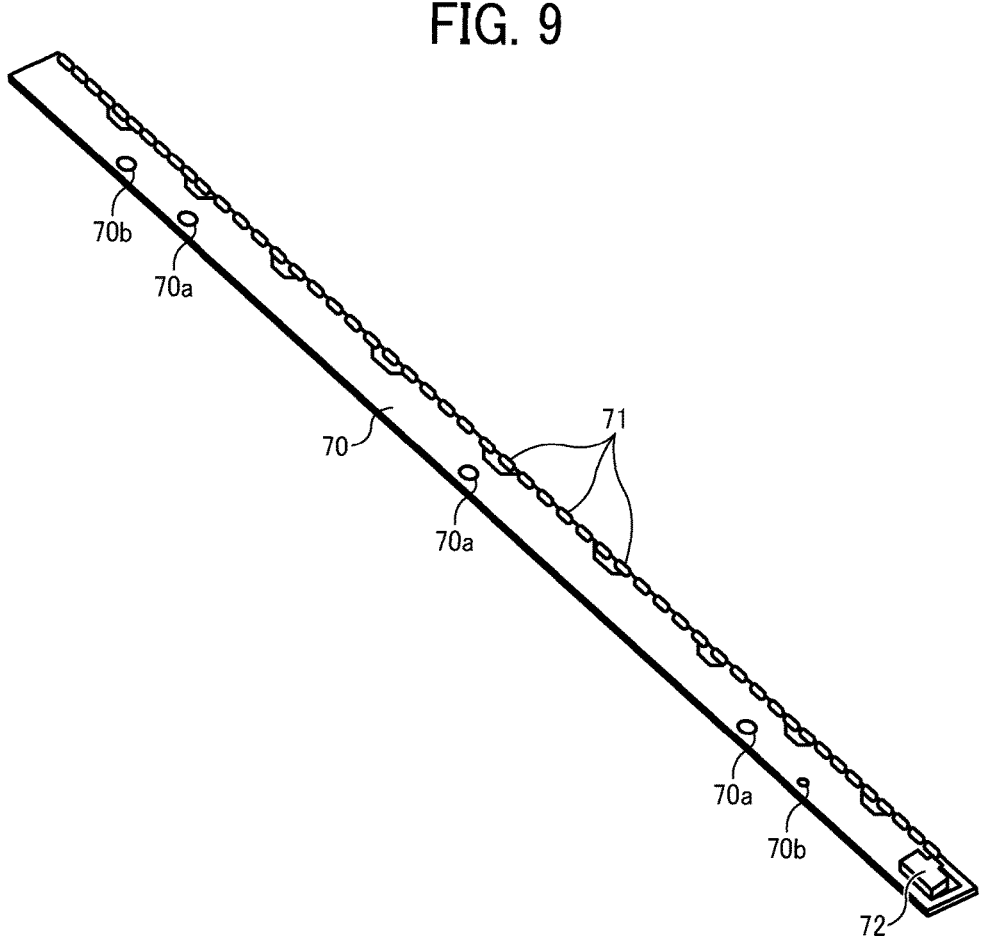
FIG. 9 is a perspective view of a board.
Figure 10:
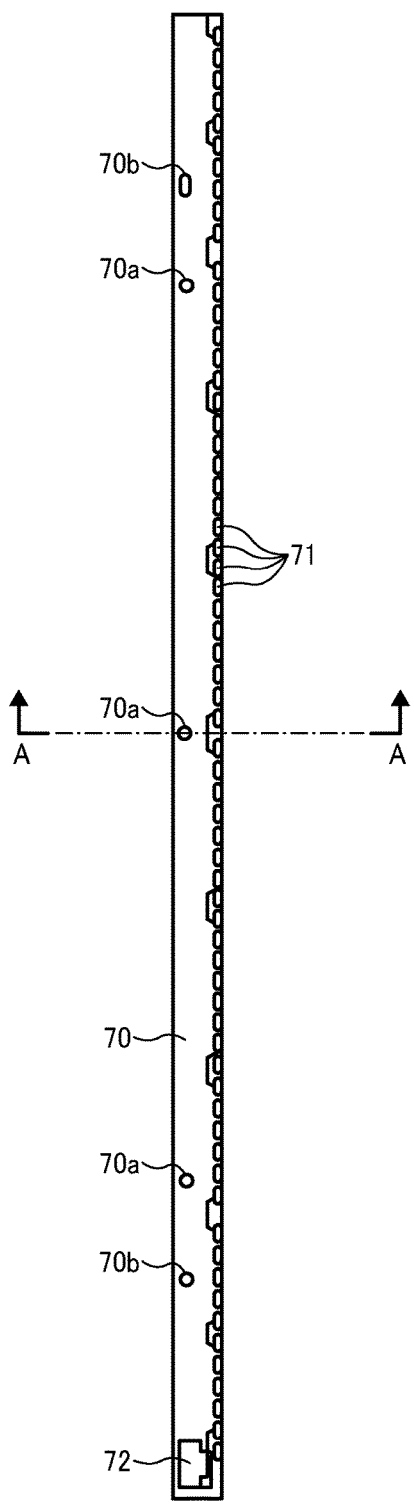
FIG. 10 is a plan view of the board.

The board 70 is positioned with respect to the base sheet metal 61 such that positioning projections 61g provided on the board holder 61d are fit in the positioning holes 70b of the board 70 (see FIGS. 9 and 10). Further, the cover 64 is also positioned with respect to the base sheet metal 61 such that the positioning projections 61g are fit in positioning holes 64b provided in the cover 64 (see FIG. 18). Then, screws 66 are screwed in screw holes 61c provided in the board holder 61d, so that the board 70 is held on the board holder 61d such that the board 70 is interposed between the board holder 61d and the cover 64.

Figure 11:
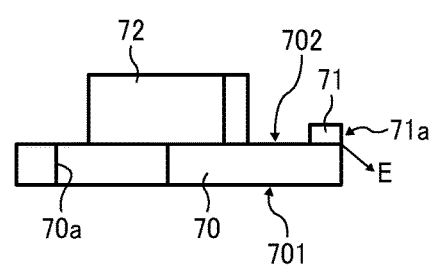
FIG. 11 is a cross-sectional view along line A-A in FIG. 10.

FIG. 9 is a perspective view of the board 70, FIG. 10 a plan view of the board 70, and FIG. 11 is a cross-sectional view along line A-A in FIG. 10. On the board 70, the plurality of side-view type LEDs 71 as the light source are mounted in a longitudinal direction (main scanning direction) on the board. The plurality of LEDs 71 are mounted on an LED mount face 702 of the board 70 such that light emission surfaces 71a are aligned on one end face in the short direction of the board 70 (the end face on the light guide side). With this arrangement, as illustrated in arrow E in FIG. 11, the light directed toward the board 70 from the light emission surfaces 71a of the LEDs 71 enters the light guide 63 without being vignetted by the board 70, whereby the light of the LEDs 71 is efficiently used to read the document.

Further, on one end portion, of the LED mount face 702, in the longitudinal direction of the board 70, there is mounted a connector 72. At three places on the other side in the short direction of the board, there are equidistantly provided screw through-holes 70a through which the screws 66 (see FIG. 6 and other drawings) pass. Further, the positioning holes 70b are formed at the places more sideward than the screw through-holes 70a on the sides.

Figure 12:
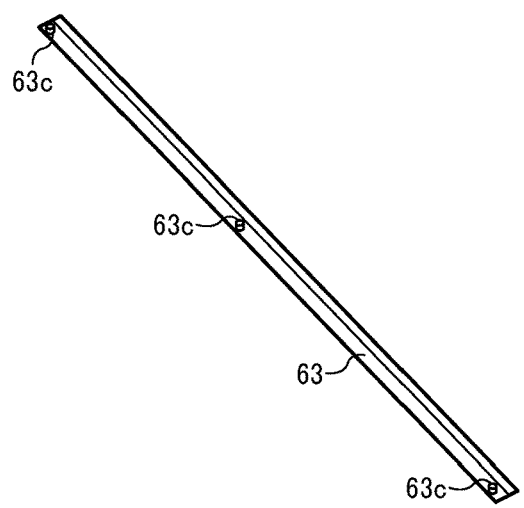
FIG. 12 is a perspective view of a light guide.
Figure 13:
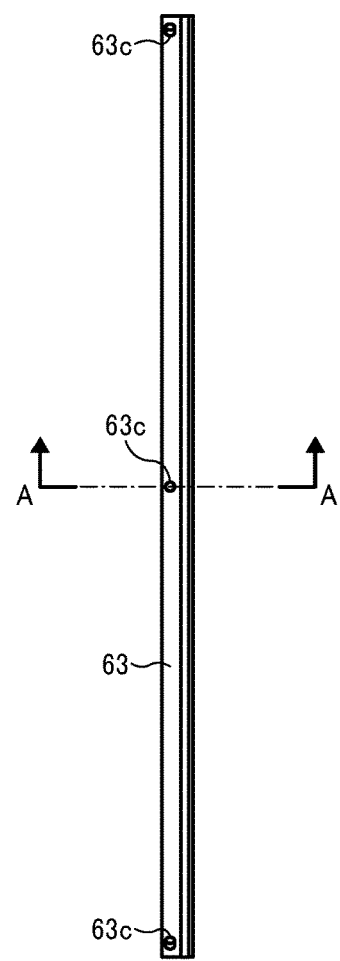
FIG. 13 is a plan view of the light guide.
Figure 14:
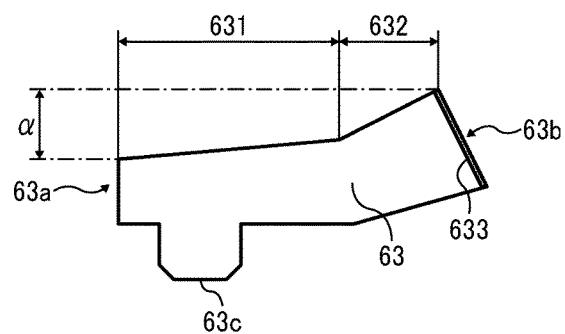
FIG. 14 is a cross-sectional view along line A-A in FIG. 13.

FIG. 12 is a perspective view of the light guide 63, FIG. 13 is a plan view of the light guide 63, and FIG. 14 is a cross-sectional view along line A-A in FIG. 13. The light guide 63 is made of resin and the like having a high transmittance such as acrylic and has a light entering side part 631 extending in a light emitting direction of the LEDs 71 and a light emitting side part 632 bent upward (to the exposure glass side) from the light entering side part. Further, the light guide 63 has a shape in which the thickness gradually increases from an incident surface 63a to an emission surface 63b. Further, on the lower surface of the light entering side part 631 of the light guide 63, the positioning projections 63c are formed on the center and the both sides in the longitudinal direction.

A diffusing agent 633, such as a diffuser, is applied to the emission surface 63b of the light guide 63. With this arrangement, when the light from the LEDs 71 is emitted from the emission surface 63b, the light is diffused. Thus, it is possible to reduce variety of illuminance and chromaticity, of the light applied to the document, in the main scanning direction due to the variety of chromaticity and illuminance between the LEDs.

Of the irradiation light emitted from each of the LEDs 71, the light in the direction of the emission centerline (the light whose directivity angle is zero) has the maximum irradiation intensity, and the reduction ratio of the irradiation intensity is larger for the large angle. Thus, the light having a small directivity angle has an irradiation intensity close to the maximum irradiation intensity; however, the light having a large directivity angle has an irradiation intensity much smaller than the maximum irradiation intensity. As a result, there is created an illuminance distribution having a ripple shape in which the illuminance distribution in the main scanning direction has high illuminance at places corresponding to the places at which the LEDs 71 are disposed and in which the illuminance is low at the places corresponding to the central parts between the LEDs 71.

However, since the diffusing agent 633 as the diffuser is applied to the emission surface 63b of the light guide 63 to diffuse the light emitted from the emission surface 63b of the light guide, it is possible to reduce or prevent generation of the above-described ripple-shaped illuminance distribution. In some embodiments, as the diffuser, fine asperities may be formed on the emission surface 63b by sandblast processing, to diffuse the light emitted from the emission surface 63b. Alternatively, a diffuser sheet may be attached to the emission surface 63b of the light guide to diffuse the light emitted from the emission surface 63b.

Figure 15:
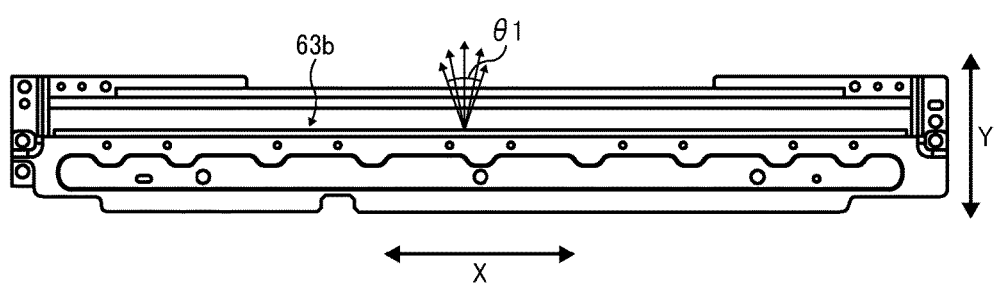
FIG. 15 is a diagram illustrating a diffusion angle in the longitudinal direction of an emission surface.
Figure 16:
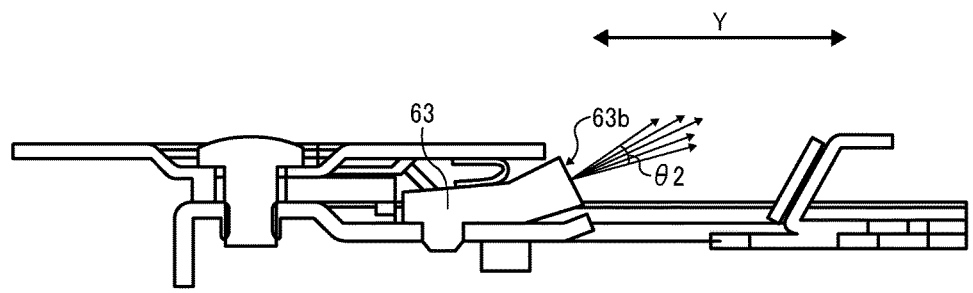
FIG. 16 is a diagram illustrating a diffusion angle in the short direction of the emission surface.

Further, in a preferred configuration, the light emitted from the emission surface 63b is diffused such that a diffusion angle $\theta1$ (illustrated in FIG. 15) in the longitudinal direction (the main scanning direction X) of the emission surface 63b is larger than a diffusion angle $\theta2$ (illustrated in FIG. 16) in the short direction of the emission surface 63b. Such a configuration is achieved by making the concavo-convex shapes of the emission surface 63b in a predetermined shape. As illustrated in FIG. 16, if the diffusion angle $\theta2$ in the short direction is larger, a larger amount of the light fails to enter the illumination area L (see FIG. 21) and the reflector 62, and the light intensity applied to the illumination area L is smaller. On the other hand, as illustrated in FIG. 15, as the diffusion angle $\theta1$ in the main scanning direction X, the ripple shape of the illuminance distribution in the main scanning direction can be reduced; therefore, a larger diffusion angle $\theta1$ is preferable. Thus, if the diffusion angle θ1 in the main scanning direction X is larger than the diffusion angle θ2 in the short direction, it is possible to reduce decrease in the intensity of the light emitted in the illumination area L, and at the same time, it is possible to successfully reduce the ripple shape of the illuminance distribution in the main scanning direction X. In the present embodiment, the diffusion angle θ1 in the main scanning direction X is set to approximately 25°, and the diffusion angle θ2 in the sub-scanning direction set to approximately 15°.

Figure 17:
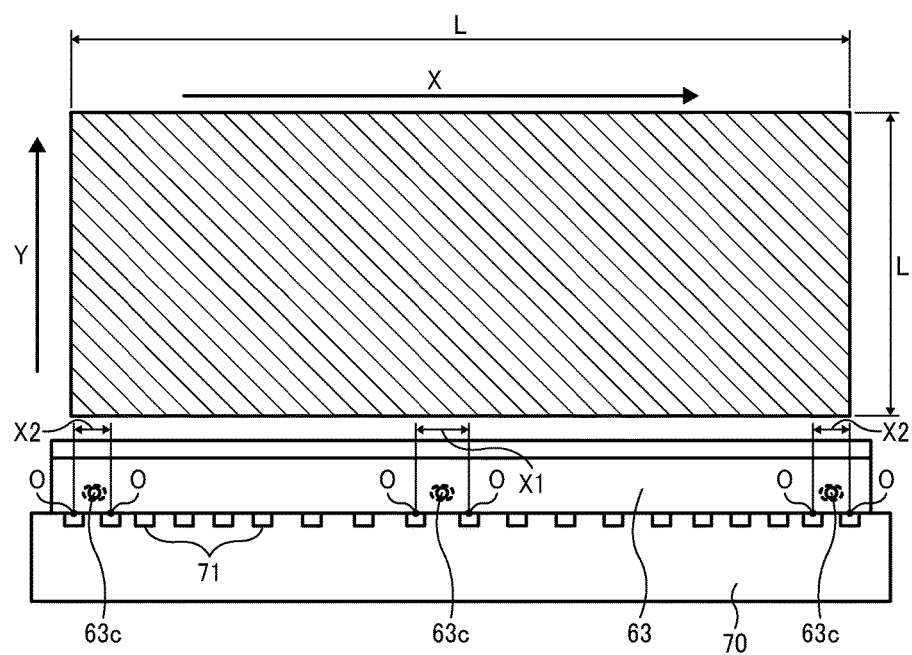
FIG. 17 is a diagram illustrating a positional relationship between positioning projections of the light guide and light-emitting diodes (LEDs)

FIG. 17 is a diagram illustrating a positional relationship between the positioning projections 63c of the light guide 63 and the LEDs 71. As illustrated in FIG. 17, each of the positioning projections 63c of the light guide 63 is located between luminescence centers O of the adjacent LEDs 71. With this arrangement, lower luminescence intensity light is allowed to enter the positioning projections 63c than in the case that the positioning projections 63c is disposed on the emission centerlines of the LEDs 71. This arrangement allows the low luminescence intensity light to leak from the positioning projections 63c, whereby the illuminance distribution in the main scanning direction can be uniform.

In an optical system such as the imaging lens unit 403 (see FIG. 5), the light intensity on the end portion in the main scanning direction decreases depending on the angle of view. Therefore, in the present embodiment, as illustrated in FIG. 17, distances X2 each between the LEDs 71 mounted on the end portions in the longitudinal direction (the main scanning direction X) of the board 70 are shorter than a distance X1 between the LEDs 71 at the center portion in the longitudinal direction (the main scanning direction X). With this configuration, the illuminances on the end portions in the main scanning direction can be increased, so that it is possible to compensate the decrease in the light intensity on the end portions in the main scanning direction, depending on the angle of view in an optical system such as the imaging lens unit 403 (see FIG. 5).

Figure 18:
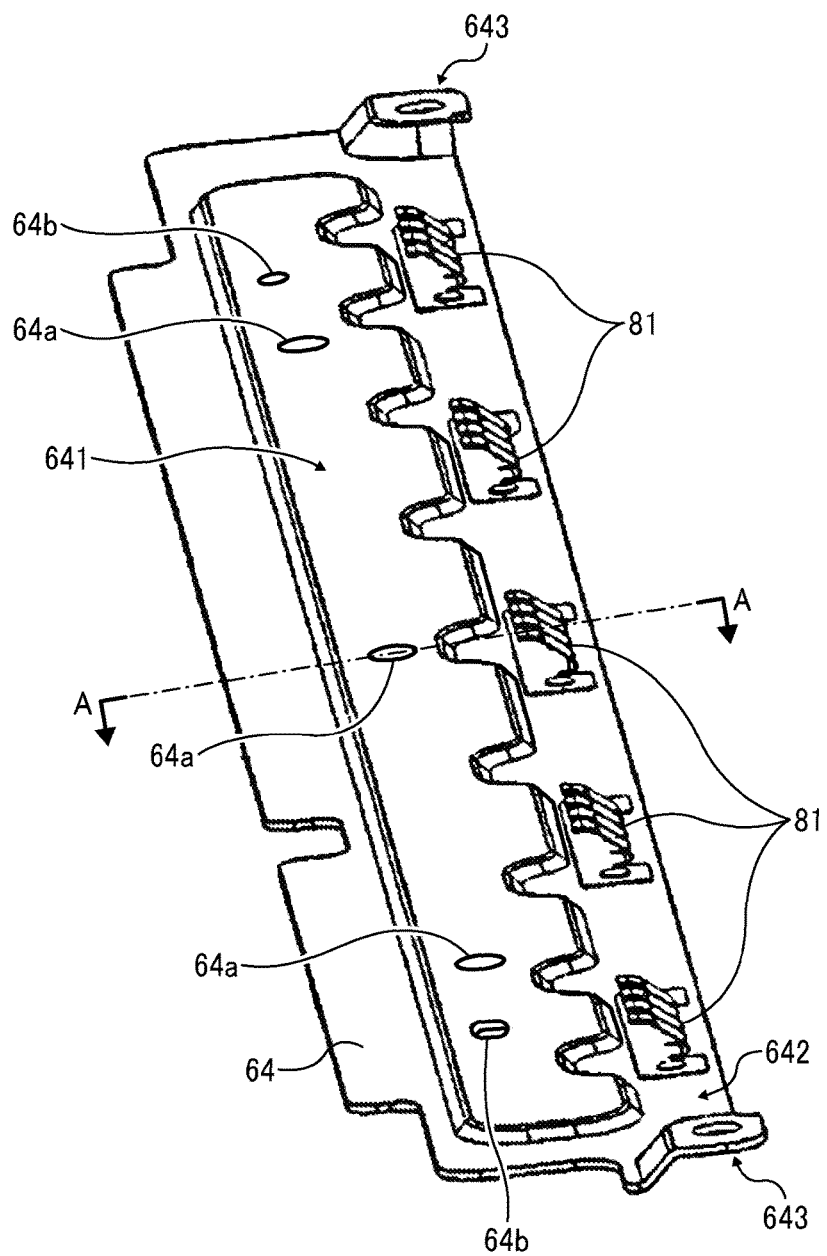
FIG. 18 is a perspective view of a cover.
Figure 19:
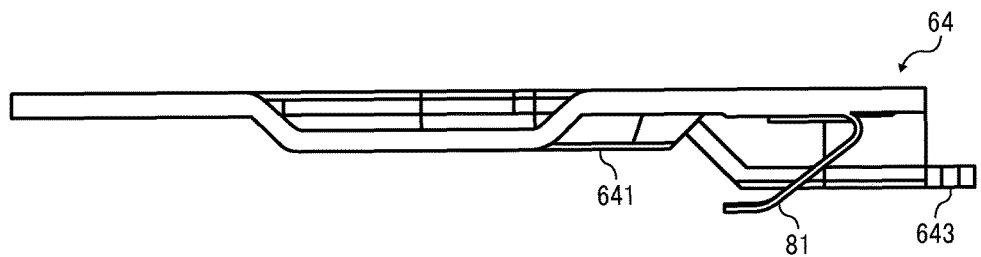
FIG. 19 is a cross-sectional view along line A-A in FIG. 18.

FIG. 18 is a perspective view of the cover 64, and FIG. 19 is a cross-sectional view along line A-A in FIG. 18. As illustrated in FIG. 18, the cover 64 includes a sheet metal, and on a light-guide-facing surface 642 facing the light guide 63, there are fixed plate springs 81 equidistantly at five places in the longitudinal direction (the main scanning direction). Further, on the opposite portion, facing the board 70, of the cover 64, there is formed a board pressing portion 641 which presses the board 70 against the base sheet metal 61. Further, in the periphery on the end opposite to the light guide side of the board pressing portion 641, there are formed screw through-holes 64a equidistantly at three places in the longitudinal direction, where the screws 66 (see FIG. 6) pass through the screw through-holes 64a. Further, on the main scanning direction end sides of the screw through-holes, there are formed the positioning holes 64b at which the base sheet metal 61 is positioned. Further, on the both ends, in the main scanning direction, on the light guide side of the cover 64, there are formed screwed portions 643 which are fixed to the base sheet metal 61 with screws.

Figure 20:
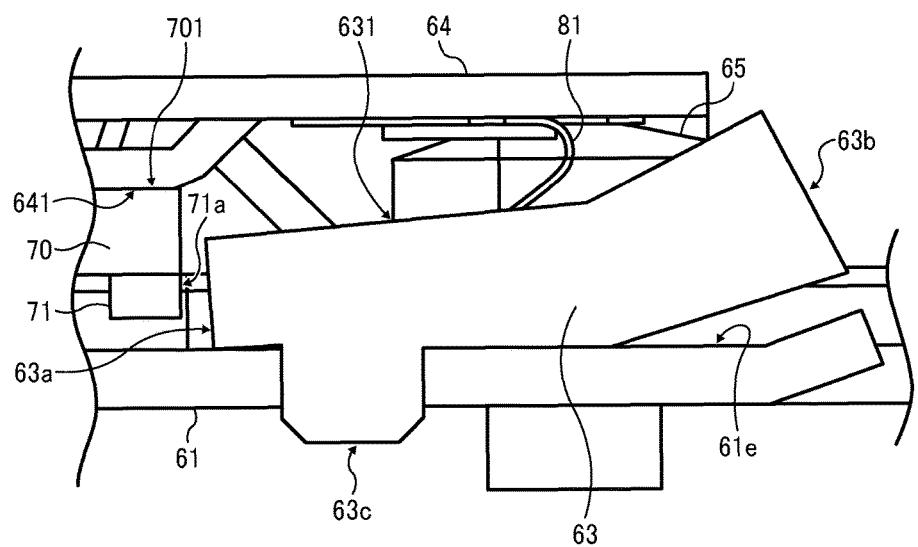
FIG. 20 is an enlarged cross-sectional view of the periphery of the light guide of the lighting unit.

FIG. 20 is an enlarged cross-sectional view of the periphery of the light guide 63 of the lighting unit 401. As illustrated in FIG. 20, the plate springs 81 of the cover 64 are in contact with the light entering side part 631 of the light guide 63, and the light guide 63 is pressed against the light guide holder 61e of the base sheet metal 61 by the plate springs 81. Further, the board pressing portion 641 of the cover 64 is in contact with a non-mount face 701 of the board 70, on which the LEDs 71 are not mounted, so that the board pressing portion 641 presses the board 70 toward the board holder 61d (see FIG. 8).

As illustrated in FIG. 20, the center, in the vertical direction, of the light emission surfaces 71a of the LEDs 71 is almost aligned with the center, in the vertical direction, of the incident surface 63a of the light guide 63 while the light guide 63 and the board 70 are positioned at and held by the base sheet metal 61. With this arrangement, the light emitted from the light emission surfaces 71a of the LEDs 71 can efficiently enter the light guide 63.

Since the light guide 63 is made of resin such as acrylic, the thermal expansion rate is high. By elastically pressing, with the plate springs 81 or the like, the light guide 63 toward the board holder 61d, the thermal expansion of the light guide 63 can be absorbed by the plate springs 81 being deformed, when the light guide 63 thermally expands. With this arrangement, it is possible to reduce warping of the light guide 63 in the main scanning direction and to reduce displacement of the center, in the vertical direction, of the light emission surfaces 71a of the LEDs 71 with respect to the center, in the vertical direction, of the incident surface 63a of the light guide 63; whereby it is possible to reduce decrease in the illuminance of the main scanning direction.

Further, as illustrated in FIG. 20, the board pressing portion 641 is also in contact with almost the end portion, on the light guide 63 side, of the board 70, and presses also the end portion, on the light guide 63 side, of the board 70 toward the board holder 61d (see FIG. 8). In the case of a configuration in which the board 70 is pressed against the board holder 61d only in the periphery of the partial view of the screws 66 (see FIG. 8), the light guide side of the board 70 is vertically displaced with respect to a specified position in some cases. However, since the end portion on the light guide 63 side of the board 70 is also pressed by the board holder 61d, the light guide side of the board 70 can be positioned at the specified position. With this arrangement, it is possible to reduce displacement of the center, in the vertical direction, of the light emission surfaces 71a of the LEDs 71 with respect to the central position, in the vertical direction, of the incident surface 63a of the light guide 63, whereby it is possible to reduce decrease in the illuminance in the main scanning direction.

Further, in the present embodiment, the base sheet metal, against which the cover 64 presses the board 70 and the light guide 63, is made of metal, which has high thermal conductivity. With this arrangement, heat of the board 70 and the light guide 63 can be effectively conducted to the base sheet metal, and can be radiated by the base sheet metal. As a result, it is possible to reduce the thermal expansion of the board 70 and the light guide 63, and it is thus possible to reduce variation in the positional relationship between the LEDs 71 and the light guide 63, whereby the light emitted from the LEDs 71 can be efficiently guided to the illumination area L.

Further, in the present embodiment, the cover 64 and the plate springs 81 disposed on the cover are also made of metal. With this arrangement, the heat of the board 70 can be effectively conducted to the board pressing portion 641 of the cover 64, which is in contact with the board 70, and the heat of the board 70 can be radiated from the cover 64. This arrangement can effectively reduce the thermal expansion of the board 70. Further, the heat of the light guide 63 can be effectively conducted to the metal cover 64 via the metal plate springs 81, and the heat of the light guide 63 is thus radiated from the cover 64. With this arrangement, the thermal expansion of the light guide 63 can be effectively reduced.

Figure 21:
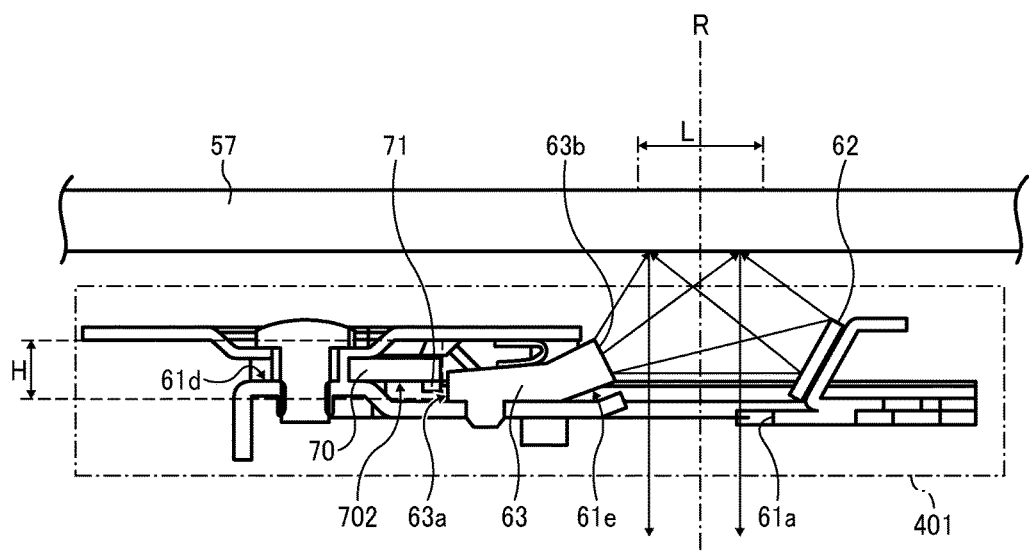
FIG. 21 is a cross-sectional view illustrating the lighting unit and an exposure glass.

FIG. 21 is a cross-sectional view illustrating the lighting unit 401 and the exposure glass 57. As illustrated in FIG. 21, the light emitted from the LEDs 71 enters the incident surface 63a of the light guide 63, moves to the emission surface 63b while being totally reflected in the light guide 63, and is emitted from the emission surface 63b. Part of the light emitted from the emission surface 63b of the light guide goes directly to the illumination area L and illuminates a document surface of a document, which is an irradiated surface, placed on the exposure glass 57. The rest of the light goes to the illumination area L after being reflected by the reflector 62, and illuminates the document surface of the document placed on the exposure glass 57. The light applied to the illumination area L is reflected by the document surface on the exposure glass 57 and goes toward a reflection mirror 402a illustrated in above FIG. 5 after going through the opening 61a of the base sheet metal 61.

Figure 22:
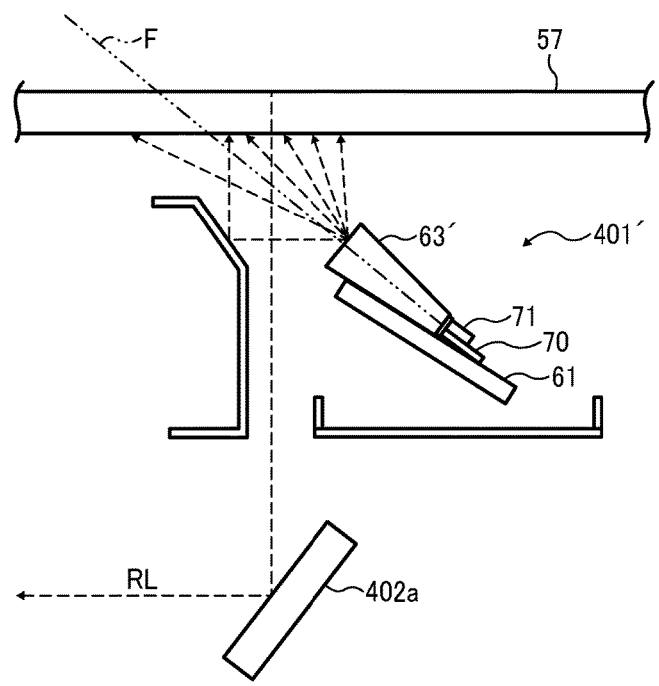
FIG. 22 is a schematic cross-sectional view of a conventional lighting unit.

FIG. 22 is a schematic cross-sectional view of a conventional lighting unit 401'. As illustrated in FIG. 22, if a light guide 63' has a shape that extends straight in a light emitting direction F of the LEDs 71, the base sheet metal 61 must be inclined with respect to a surface of the exposure glass, and a board 70 and a light guide 63' must be held on the inclined surface. As a result, a lighting unit 401 is long in the vertical direction, and the scanner section 10 is disadvantageously large in the vertical direction.

In contrast, in the present embodiment, the light guide 63 extends in the light emitting direction and is bent toward the exposure glass side on the way of the light guide, so that the base sheet metal 61 can be almost parallel to the exposure glass 57 as illustrated in FIG. 21. With this arrangement, the lighting unit 401 can be shorter in the vertical direction than in the configuration illustrated in above FIG. 22, and the scanner section 10 can thus be downsized.

Further, in the present embodiment, the board 70 is held such that the LED mount face 702 of the board 70 is faced downward and such that the board 70 is on the contact glass side with respect to the LEDs 71. With this arrangement, as illustrated in FIG. 21, the board 70 can be disposed within the vertical height range of the light guide 63. With this arrangement, the lighting unit 401 can be further downsized in the vertical direction, and the scanner section 10 can thus be downsized in the vertical direction.

Further, in the present embodiment, the cover 64 is disposed on the exposure glass side with respect to the light guide 63. With this arrangement, the plate springs 81 can be disposed in a dead space a between the upper surface of the light entering side part 631 of the light guide 63 and the upper end of the light emitting side part 632 (see FIG. 14). With this arrangement, the light guide 63 can be pressed against the light guide holder 61e by the plate springs 81 without making the lighting unit 401 larger in the vertical direction.

Further, in the present embodiment, the cover 64 is made of a sheet metal. Since the cover 64 is made of a sheet metal, the cover 64 can be made stiff without providing reinforcement ribs or increasing the thickness, unlike the case of a cover made of resin. With this arrangement, the lighting unit 401 can be further downsized in the vertical direction than a cover made of resin.

The above description is given to just an example, and each of the following aspects provides its specific advantageous effect.

Aspect 1:

A lighting device, such as a lighting unit, includes: a light source, such as the LEDs 71, to emit light; a board 70 mounting the light source a mount surface perpendicular to a light emission surface of the light source; and a light guide 63. The light guide 63 has an incident surface which the light emitted from the light source enters. The light guide 63 is opposed to the light emission surface. The light guide 63 extends from the incident surface in a direction of the emitted light and is bent toward an irradiated surface (such as the document surface) of an irradiation target (such as the document) on a way of the light guide. The board 70 is disposed such that an opposite surface of the board 70 opposite the mount surface is opposed to the irradiated surface of the irradiation target. With this arrangement, it is possible to dispose the board within the length, of the light guide, in the direction perpendicular to the irradiated surface, and it is thus possible to shorten the length, of the lighting device, in the direction perpendicular to the irradiated surface by the thickness of the board.

Aspect 2:

The lighting device of aspect 1 includes: an optical guide holder, such as the base sheet metal 61, that holds the light guide 63; and a pressing member, such as the cover 64, to press the light guide 63 toward the optical guide holder, the pressing member including a biasing member, such as the plate springs 81, to bias the light guide 63 toward the optical guide holder. The pressing member is disposed at a position closer to the irradiated surface of the irradiation target than the optical guide holder in the direction perpendicular to the mount surface on which the light source is mounted. With this arrangement, as described in the embodiment, it is possible to dispose the biasing member, which is the plate springs 81, in a dead space of the light guide 63 between the surface, on the illumination area side, of the horizontally extending part of the light guide 63 and the end, on the illumination area side, of the bent part of the light guide 63. With this arrangement, it is possible to bias the light guide 63 toward the optical guide holder such as the base sheet metal 61 by using the biasing member without making the lighting device such as the lighting unit 401 larger in the direction perpendicular to the irradiated surface such as the document surface.

Aspect 3:

In the lighting device of aspect 2, the light guide 63 and the board 70 are positioned on the optical guide holder such as the base sheet metal 61. With this arrangement, the light guide 63 and the board 70 are positioned on the same member; thus, it is possible to achieve a more accurate positional relationship between the light guide 63 and the light source such as the LEDs 71 mounted on the board 70 than in the case that the light guide 63 and the board 70 are positioned on different members. This arrangement allows the light from the LEDs 71 to enter the light guide uniformly in the main scanning direction, and the illuminance distribution in the illumination area L can thus be uniform in the main scanning direction.

Aspect 4:

In the lighting device of aspect 2 or 3, the board 70 is screwed on the optical guide holder, such as the base sheet metal 61, at screwed positions, such as the screw through-holes 70a and the positioning holes 70b); and the pressing member such as the cover 64 includes a board pressing portion 641 to press, toward the optical guide holder, a portion of the board closer to the light guide than the screwed portions. As described in the embodiment, this arrangement can prevent the light guide side of the board from being lifted from the optical guide holder such as the base sheet metal 61 with the screwed portion as a fulcrum. With this arrangement, it is possible to reduce deviation of the positional relationship between the light source such as the LEDs 71 mounted on the board and the light guide 63 from a specified relationship; thus, the light emitted from the light source can efficiently enter the light guide, whereby decrease in the illuminance in the illumination area L can be reduced.

Aspect 5:

In the lighting device of any one of aspects 1 to 4, the light source such as the LEDs 71 is mounted on an end the board 70 opposed to the light guide. With this arrangement, as described in the embodiment, it is also possible for the light that is part of the light emitted from the light source such as the LEDs 71 and is traveling toward the board side to enter the light guide without being vignetted by the board. As a result, the light source can be efficiently used.

Aspect 6:

In the lighting device of any one of aspects 1 to 5, a diffuser, such as the diffusing agent 633, fine asperities, or a diffuser sheet, is disposed on the emission surface 63b of the light guide 63, to diffuse light. With this arrangement, as described in the embodiment, the illuminance distribution in the illumination area can be uniform.

Aspect 7:

In the lighting device of aspect 6, the diffuser is formed such that the light emitted from the emission surface 63b has a diffusion angle θ1 in the longitudinal direction of the board that is larger than a diffusion angle θ2 in the short direction of the board. With this arrangement, as described in the embodiment, the illuminance distribution in the illumination area can be uniform, and it is possible to reduce the emission of light to the outside of the illumination area.

Aspect 8:

In the lighting device of any one of aspects 1 to 7, a plurality of light sources, such as LEDs 71, is arrayed in straight line in a longitudinal direction of the board 70; and a distance between adjacent light sources of the plurality of light sources is smaller at an end of the board 70 in the longitudinal direction of the circuit board 70 than at a center of the circuit board 70 in the longitudinal direction. With this arrangement, as described in the embodiment, it is possible to reduce decrease in the light intensity, on the end portion in the main scanning direction, of the light entering the imaging device such as the image sensor 405 via an optical system such as the imaging lens unit 403.

Aspect 9:

An image reading device, such as the scanner section 10, includes: an illuminator, such as the lighting unit 401, to illuminate a document surface with light; and an imaging device, such as the image sensor 405, to receive reflected light from the document surface and pick up an image of the document surface. A lighting device of any one of aspects 1 to 8 is used as the illuminator. With this arrangement, the scanner section 10 can be downsized.

Aspect 10:

An image forming apparatus includes: an image reader, such as the scanner section 10, to read an image of a document surface; and an image forming device, such as the printer section 100, to form an image on a recording medium, based on information of an image read by the image reader. An image reading device of aspect 9 is used as the image reader. With this arrangement, the image forming apparatus can be downsized.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may he varied in many ways. Such variations are not to be regarded as a departure from the scope of the present disclosure and appended claims, and all such modifications are intended to be included within the scope of the present disclosure and appended claims.

What is claimed is:

1. A lighting device comprising:
   a light source to emit light and including a light emission centerline;
   a board to mount the light source on a mount surface;
   a light guide including an incident surface to receive the light emitted from the light source, the incident surface being opposed to the light emission surface, the light guide extending from the incident surface in a direction of the emitted light and bent toward a surface of an irradiation target;
   an optical guide holder to hold the light guide; and
   a cover, wherein the board is substantially parallel with, in contact with, and disposed between, both the optical guide holder and the cover and substantially parallel with the light emission centerline such that a surface of the board opposite the mount surface is relatively closer to the cover than the mount surface.

2. A lighting device comprising:
   a light source to emit light;
   a board to mount the light source on a mount surface;
   a light guide including an incident surface to receive the light emitted from the light source, the incident surface being opposed to the light emission surface, the light guide extending from the incident surface in a direction of the emitted light and bent toward a surface of an irradiation target;
   an optical guide holder to hold the light guide;
   a cover, wherein the board is in contact with and disposed between both the optical guide holder and the cover such that a surface of the board opposite the mount surface is relatively closer to the cover than the mount surface; and
   a pressing member to press the light guide toward the optical guide holder, the pressing member including a biasing member to bias the light guide toward the optical guide holder,
   wherein the pressing member is disposed between the cover and the light.

3. The lighting device according to claim 2, wherein the light guide and the board are positioned on the optical guide holder.

4. The lighting device according to claim 2, wherein the board is screwed at a screwed position on the optical guide holder, and
   the pressing member includes a board pressing portion to press, toward the optical guide holder, a portion of the board relatively closer to the light guide than the screwed position.

5. The lighting device according to claim 1, wherein the light source is mounted on an end of the board opposed to the light guide.

6. The lighting device according to claim 1, further comprising a diffuser on an emission surface of the light guide, to diffuse light.

7. The lighting device according to claim 6, wherein the diffuser is formed such that the light emitted from the emission surface of the light guide has a relatively larger diffusion angle in a longitudinal direction of the board than in a short direction of the board.

8. The lighting device according to claim 1, wherein a plurality of light sources is arrayed in straight line in a longitudinal direction of the board, and a distance between adjacent light sources of the plurality of light sources is relatively smaller at an end of the board in the longitudinal direction than at a center of the board in the longitudinal direction.

9. An image reading device comprising:

the lighting device according to claim 1 to illuminate a document surface with light; and an imaging device to receive reflected light from the document surface and pick up an image of the document surface.

10. An image forming apparatus comprising:

the image reading device according to claim 9 to read the image of the document surface; and an image forming device to form an image on a recording medium, based on information of the image read by the image reading device.

11. An image reading device comprising:

the lighting device according to claim 2 to illuminate a document surface with light; and an imaging device to receive reflected light from the document surface and pick up an image of the document surface.

12. An image forming apparatus comprising:

the image reading device according to claim 11 to read the image of the document surface; and an image forming device to form an image on a recording medium, based on information of the image read by the image reading device.

13. The lighting device according to claim 9, further comprising a diffuser on an emission surface of the light guide, to diffuse light.

14. The lighting device according to claim 13, wherein the diffuser is formed such that the light emitted from the emission surface of the light guide has a relatively larger diffusion angle in a longitudinal direction of the board than in a short direction of the board.

15. The lighting device according to claim 9, wherein a plurality of light sources is arrayed in straight line in a longitudinal direction of the board, and a distance between adjacent light sources of the plurality of light sources is relatively smaller at an end of the board in the longitudinal direction than at a center of the board in the longitudinal direction.

16. The lighting device according to claim 11, further comprising a diffuser on an emission surface of the light guide, to diffuse light.

17. The lighting device according to claim 16, wherein the diffuser is formed such that the light emitted from the emission surface of the light guide has a relatively larger diffusion angle in a longitudinal direction of the board than in a short direction of the board.

18. The lighting device according to claim 11, wherein a plurality of light sources is arrayed in straight line in a longitudinal direction of the board, and a distance between adjacent light sources of the plurality of light sources is relatively smaller at an end of the board in the longitudinal direction than at a center of the board in the longitudinal direction.

19. The lighting device according to claim 5, wherein the light source is mounted on the board so that light emission surfaces of a plurality of light sources are aligned on an end face of the board facing the light guide.

* * * * *